(12) United States Patent
Gremetz et al.

(10) Patent No.: US 11,224,851 B2
(45) Date of Patent: Jan. 18, 2022

(54) FLOW REACTOR PLUG

(71) Applicant: CORNING INCORPORATED, Corning, NY (US)

(72) Inventors: Sylvain Maxime F Gremetz, Varnnes sur Seine (FR); Olivier Lobet, Villiers sous Grez (FR); Alexis Maury, Chateau (FR)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/044,630

(22) PCT Filed: Apr. 2, 2019

(86) PCT No.: PCT/US2019/025448
§ 371 (c)(1),
(2) Date: Oct. 1, 2020

(87) PCT Pub. No.: WO2019/195337
PCT Pub. Date: Oct. 10, 2019

(65) Prior Publication Data
US 2021/0146328 A1 May 20, 2021

Related U.S. Application Data

(60) Provisional application No. 62/652,021, filed on Apr. 3, 2018.

(51) Int. Cl.
*B01J 19/00* (2006.01)
*B01J 19/02* (2006.01)
(Continued)

(52) U.S. Cl.
CPC ............ *B01J 19/02* (2013.01); *B01J 19/248* (2013.01); *C08L 27/12* (2013.01); *C08L 71/00* (2013.01);
(Continued)

(58) Field of Classification Search
CPC ....... B01J 3/00; B01J 3/03; B01J 19/00; B01J 19/02; B01J 19/24; B01J 19/248;
(Continued)

(56) References Cited

U.S. PATENT DOCUMENTS 8,636,964 B2   1/2014  Brunello et al.
9,126,202 B2   9/2015  Lobet et al.
(Continued)

FOREIGN PATENT DOCUMENTS

CN      103822046 A    5/2014
DE       3800245 A1    7/1989
(Continued)

OTHER PUBLICATIONS

International Search Report and Written Opinion of the International Searching Authority; PCT/US19/025448; dated Jul. 4, 2019; 12 Pages; European Patent Office.

*Primary Examiner* — Natasha E Young

(57) ABSTRACT

A plug (10) for plugging a port (P) in a flow reactor comprises a metal guide (12) having first and second ends (14,16) and a wall (18) surrounding a cylindrical interior volume (20) having an opening (22) at the first end (14); a plug body (40) having a first face (42) and an opposing second face (44) and a side surface (46) and positioned partially within the interior volume (20) with the first face (42) protruding from the opening (22); wherein the plug body (40) comprises a chemically resistant first polymer constituting at least the first face (42) and a thermally resistant second polymer constituting at least the second face (44) and at least a portion of the side surface (46).

18 Claims, 3 Drawing Sheets

(51) Int. Cl.
  *B01J 19/24* (2006.01)
  *C08L 27/12* (2006.01)
  *C08L 71/00* (2006.01)
  *F16L 55/11* (2006.01)

(52) U.S. Cl.
  CPC .... *F16L 55/1108* (2013.01); *B01J 2219/0295* (2013.01); *C08L 2201/08* (2013.01)

(58) Field of Classification Search
  CPC ............... B01J 2219/00; B01J 2219/02; B01J 2219/025; B01J 2219/0295; C08L 27/00; C08L 27/02; C08L 27/12; C08L 71/00; C08L 2201/00; C08L 2201/08; F16L 55/00; F16L 55/10; F16L 55/11; F16L 55/1108; F16L 55/16; F16L 55/168; F16L 55/17; F16L 55/1705
  See application file for complete search history.

(56) References Cited

U.S. PATENT DOCUMENTS

| | | | |
|---|---|---|---|
| 9,500,319 B2 | 11/2016 | Lingvall et al. | |
| 2007/0284390 A1* | 12/2007 | Wang | B65D 83/687 222/1 |

FOREIGN PATENT DOCUMENTS

| | | |
|---|---|---|
| JP | 2000-337581 A | 12/2000 |
| WO | 2010/130368 A1 | 11/2010 |

* cited by examiner

FLOW REACTOR PLUG

CROSS-REFERENCE TO RELATED APPLICATIONS

This application claims the benefit of priority under 35 U.S.C. § 371 of International Application No. PCT/US2019/025448 (published as WO 2019/195337), filed on Apr. 2, 2019, which claims the benefit of priority under 35 U.S.C. § 119 of U.S. Provisional Application No. 62/652,021, filed Apr. 3, 2018, the content of each of which is incorporated herein by reference in its entirety.

FIELD

The present disclosure relates to plugs useful in flow reactors with flow reactor modules to close off unused or temporarily unused fluid ports, and particularly to such plugs useful with glass and ceramic flow reactor modules.

BACKGROUND

To conduct chemical processes employing highly reactive reagents and/or high process or reaction temperatures in flow rather than in batch, it is often desirable to use flow reactors or flow reactor modules formed of highly chemically and thermally resistant materials such as glass, ceramic, and/or glass-ceramic. It is accordingly desirable to have fluid fittings including plugs also with high thermal and chemical resistance. For modular, configurable and/or reconfigurable flow reactors, it is not generally practical to use fluid fittings including plugs also made of hard glass or ceramic materials, as such materials tend to be damaged by scratching or chipping, including by mutual contact. Accordingly, it is desirable to have a removable plug which is highly resistant to thermal and chemical damage, but that also will not damage a glass, ceramic, or glass-ceramic surface.

SUMMARY

According to an aspect of the present disclosure, a plug for plugging a port in a flow reactor comprises a metal guide having first and second ends and a wall surrounding a cylindrical interior volume having an opening at the first end; a plug body having a first face and an opposing second face and a side surface and positioned partially within the interior volume with the first face protruding from the opening; wherein the plug body comprises a chemically resistant first polymer constituting at least the first face and a thermally resistant second polymer constituting at least the second face and at least a portion of the side surface.

According to another aspect of the present disclosure, a plug for plugging a port in a flow reactor, comprises a metal guide having first and second ends and a wall surrounding a cylindrical interior volume. The interior volume has an opening at the first end of the guide and is closed at the second end of the guide by a screw mated to a screw thread on the interior of the second end of the guide. The screw has a screw end face opposite the opening of the interior volume.

The plug further comprises a plug body having a first face and an opposing second face and a side surface connecting the first face and the second face. The plug body is positioned partially within the interior volume of the guide with the second face of the plug body and a first portion of the side surface of the plug body positioned inside the interior volume of the guide, and with the first face of the plug body and a second portion of the side surface of the plug body protruding from the opening of the interior volume of the guide.

The first face of the plug body comprises a recess for receiving a gasket. The second face of the plug body faces the screw end face of the screw for contact therewith.

The plug body comprises a chemically resistant first polymer, with the first face of the plug body being formed of said first polymer. The plug body further comprises a thermally resistant second polymer, with at least the first portion of the side surface of the plug body and the second face of the plug body being formed of said second polymer.

According to yet another aspect, the second polymer of the plug body is in the form of a hollow cylinder comprising a cylindrical wall with a cylindrical wall thickness. The hollow cylinder has a closed end and an open end. The closed end is closed by an end wall which has an end wall thickness, measured between an interior end surface and an exterior end surface of the end wall. The cylindrical wall has an exterior surface and an interior surface connected by a rim surface. The exterior surface of the cylindrical wall constitutes at least the first portion of the side surface of the plug body. The exterior end surface constitutes the second face of the plug body. Further, the first polymer is in the form of a cylindrical structure having a first end which constitutes the first face of the plug body and a second end which extends into the hollow cylinder to the interior end surface thereof.

Other variations and specific advantages are discussed or will be apparent from the description below. The foregoing general description and the following detailed description represent specific embodiments, and are intended to provide an overview or framework for understanding the nature and character of the claims.

DETAILED DESCRIPTION

Figure 2:
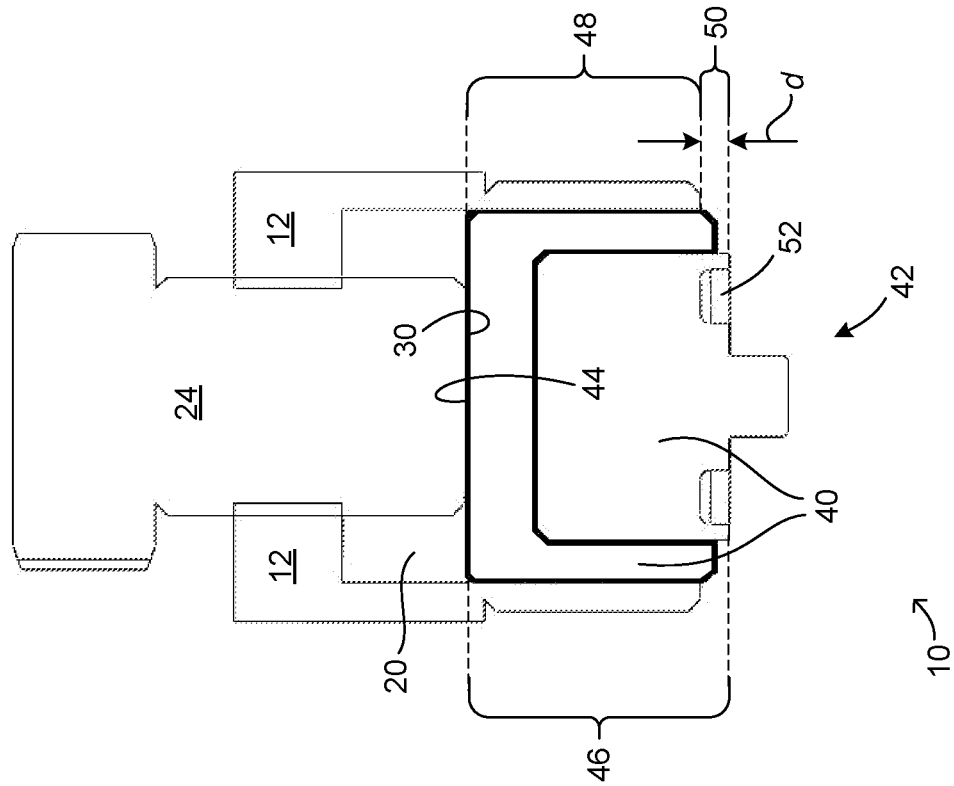
FIG. 2 is a diagrammatic cross section of the embodiment of FIG. 1.
Figure 1:
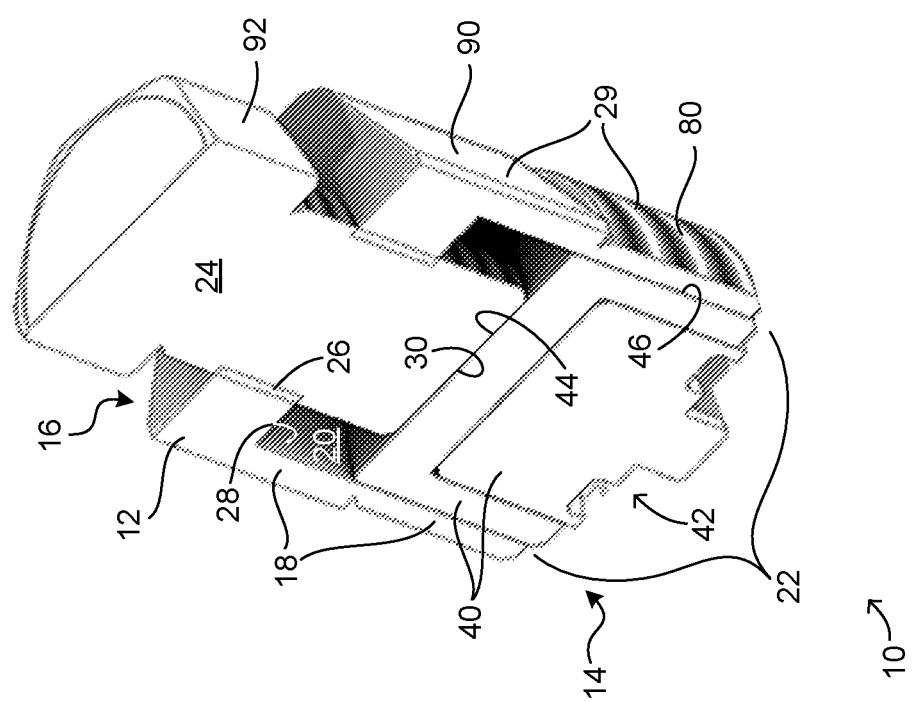
FIG. 1 is a perspective cross section of one embodiment of a plug according to the present disclosure.

FIG. 1 is a perspective cross section of one embodiment of a plug (10) according to the present disclosure. FIG. 2 is a diagrammatic cross section of the embodiment of FIG. 1. With reference to FIGS. 1 and 2, a plug (10) is shown useful for plugging a port in a flow reactor, particularly in a glass or ceramic (or glass-ceramic) flow reactor module.

The plug (10) comprises a metal guide (12) having first and second ends (14, 16) and a wall (18) surrounding a cylindrical interior volume (20). The interior volume (20) has an opening (22) at the first end (14) of the guide (12) and is closed at the second end (16) by a screw (24). The screw (24) is mated to a screw thread (26) on the interior surface (28) of the second end (16) of the guide (20). The screw (24) has a screw end face (30) opposite the opening (22) of the interior volume (20).

The plug (10) further comprises a plug body (40) having a first face (42) and an opposing second face (44) and a side surface (46) connecting the first face (42) and the second face (44). The plug body (40) is positioned partially within the interior volume (20) of the guide (12), with the second face (44) of the plug body (40) and a first portion (48) of the side surface (46) of the plug body (40) positioned inside the interior volume (20) of the guide (12). The first face (42) of the plug body (40) and a second portion (50) of the side surface (46) of the plug body (40) protrude from the opening (22) of the interior volume (20) of the guide (12). The first face (42) of the plug body (40) comprises a recess (52) for receiving a gasket such as an O-ring. The second face (44) of the plug body (40) faces the screw end face (30) for contact therewith.

The plug body (40) comprises both a chemically resistant first polymer, with the first face (42) of the plug body (40) being formed of the first polymer, and a thermally resistant second polymer, with at least the first portion (48) of the side surface (46) of the plug body (40) and the second face (44) of the plug body (40) being formed of the second polymer.

An exterior surface (29) of the wall (18) of the guide (12) desirably includes an external thread (80) at least toward the first end (14) of the guide (12) for installing and removing and adjusting the plug (10) in a holder or fixture (not shown), serving to position the plug (10) relative to a fluidic module (not shown). A surface to facilitate gripping the guide by hand or by tool, such as roughened surface or such as a hexagonally faceted surface (90) as shown in this embodiment, may also be provided on the exterior surface (29) of the guide (10) toward the second end (16) thereof. The screw 24 may also be provided with a surface to facilitate gripping the screw by hand or by tool, such as a hexagonally faceted surface (92).

Figure 4:
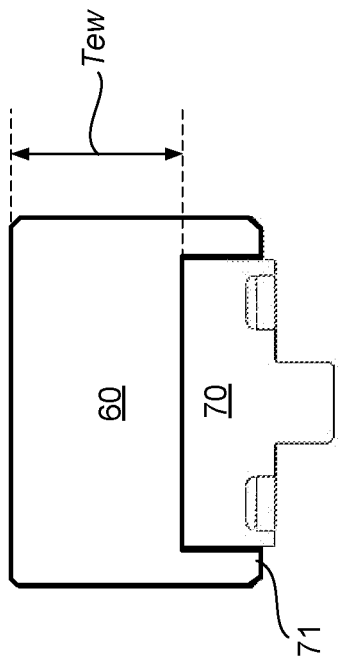
FIGS. 3, 4, and 5 are diagrammatic cross sections showing certain alternative features of various embodiments of a plug body 40 of the present disclosure.
Figure 5:
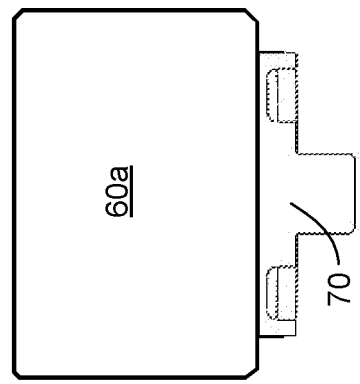
Figure 3:
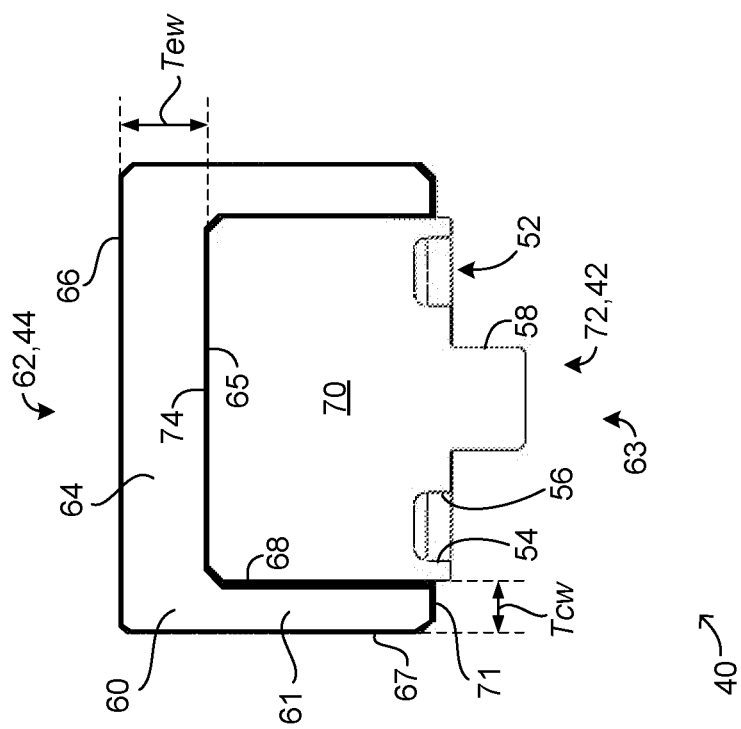

FIGS. 3, 4, and 5 are diagrammatic cross sections showing certain alternative features of various embodiments of a plug body 40 of the present disclosure, useful in embodiments like the plug of FIGS. 1 and 2.

In the embodiment of FIG. 3 the second polymer of the plug body (40) is in the form of a hollow cylinder (60) comprising a cylindrical wall (61) with a cylindrical wall thickness Tcw. The hollow cylinder (60) has a closed end (62) and an open end (63) with the closed end (62) closed by an end wall (64) having an end wall thickness Tew and an interior end surface (65) and an exterior end surface (66). The cylindrical wall (61) likewise has an exterior surface (67) and an interior surface (68) which are connected by a rim surface (71).

In a plug (10) as seen in FIGS. 1 and 2 together with FIG. 3, the exterior surface (67) of the cylindrical wall (61) constitutes at least the first portion (48) of the side surface (46) of the plug body (40). In other words, the cylindrical wall (61) extends at least level with the opening (22) of the interior volume (20) of the guide (12). In some embodiments the cylindrical wall (61) extends beyond the opening (22), as shown in FIGS. 1 and 2. The exterior end surface (66) of the hollow cylinder (60) constitutes the second face (44) of the plug body (40).

In the embodiment of FIG. 3 the first polymer is in the form a cylindrical structure (70) having a first end (72) which constitutes the first face (42) of the plug body (40), and a second end (74) extending into the hollow cylinder (60) to the interior end surface (65) thereof. In some embodiments the cylindrical structure (70) extends beyond the rim surface (71) as shown in FIGS. 1-4, or beyond the alternative solid cylinder (60a) of the second polymer, as shown in FIG. 5.

In operation of the plug (10), the (solid) cylindrical structure (70) of the plug body (40), formed of a chemically resistant polymer, serves to provide chemical resistance to the first face (42) of the plug body (40) against working fluids, such as various solvents and reactants, which come in contact with at least portions of the face (42). Thus face (42) (end (72)) may deteriorate over time. Accordingly in some embodiments the cylindrical structure (70) is separable from the hollow cylinder (60), allowing for replacement of a new cylindrical structure (70) within an existing hollow cylinder (60) and plug (10).

Further, the first polymer desirably has such good chemical resistance that when a sample thereof in the form of a cylinder of diameter of 1+/−0.1 cm and length of 5+/−0.1 cm is subjected to immersion in 70% by volume $HNO_3$ (obtainable from Fisher Chemical) for one week at 90+/−1° C., the sample is not visually/significantly damaged and has a weight gain of not more than 1% of its initial weight, more desirably not more than 0.1%. Preferred materials include PTFE, FEP, PFA, and ETFE, with PFA currently most preferred, thus minimizing any rate of deterioration.

It is also desirable that the recess (52) for holding a gasket or O-ring in the face (42) of the plug body (40) (the face corresponding to the first end (72) of the (solid) cylindrical structure (70)) includes both a radially outer wall (54) and a radially inner wall (56). Compared to a recess with only radially outer wall, this minimizes contact between a working fluid in the reactor or module and the gasket or O-ring material, increasing the durability of a gasket or O-ring and the effective chemical durability of the plug (10).

It is also desirable that the face (42) of the plug body (40) (corresponding to the first end (72) of the (solid) cylindrical structure (70)) includes a central post (58). The central post (58) extends into a fluid port to be plugged and reduces a dead volume of fluid within a plugged reactor or module. This also reduces the fluid volume in contact with the face (42) of the plug body (40), increasing the effective chemical resistance of the face (42) and plug body (40), and hence of the plug (10). (The central post (58) also aids in the alignment of the plug (10) with the port to be plugged.)

In operation of the plug (10), the hollow cylinder (60) formed of a thermally resistant polymer serves to provide increased thermal and mechanical resistance to the plug body (40) and hence to the plug (10). Accordingly, it is desirable that the cylindrical wall thickness Tcw of the wall (61) of the hollow cylinder (60) is in the range of at least 1.2 mm up to and including 2 mm, or even up to and including 4 mm. Similarly, it is desirable that the end wall thickness Tew of the end wall (64) of the hollow cylinder (60) is in the range of at least 1 mm up to and including 10 mm, and for a desirable combination of compactness and strength, in the range of at least 2 mm up to and including 4 mm.

It is also desirable, to minimize the likelihood and/or the extent of any significant thermal creep or deformation, to have only a small amount of the plug body (40) protruding from the opening (22) at the first end (14) of the guide (12). Specifically, it is desirable that the distance d (shown in FIG. 2) by which the plug body (40) protrudes is in the range of from at least 0.1 mm to less than 3 mm, more desirably in the range of from at least 0.5 mm to less than 2 mm. A small protrusion distance d allows the metal guide (12) to provide significant support to the plug body (40), while a sufficient protrusion distance d of at least 0.1 mm and desirably of at least 0.5 mm prevents the metal guide from coming into contact with the surface of the fluidic module the port of which is being plugged, preventing damage to the glass or ceramic (or glass-ceramic) of the module. Having the cylindrical structure (70) protrude slightly from the hollow cylinder (60) allows for maintaining compression on a gasket or O-ring even with some deformation of the cylindrical structure (70) (some decrease of the protrusion). Having the hollow cylinder (60) protrude slightly from the guide (12) allows for protection of the fluidic module from the guide (12) even with some deformation of the cylindrical structure (70).

Given the role of the hollow cylinder (60) in resisting deformation under load at temperature, the second polymer, the thermally and mechanically resistant polymer, desirably has a temperature of deflection under load according to ISO 75-1/-2, method A at 1.8 MPa in the range of from 160° C. to 260° C., more desirably from 230° C. to 260° C. Accordingly, PEEK (polyether ether ketone) is a preferred material for the second polymer; more particularly filled or reinforced PEEK, such as glass-filled or carbon-filled PEEK. As examples, Ketron® 1000 PEEK is a PEEK material having a temperature of deflection under load according to ISO 75-1/-2, method A at 1.8 MPa of 160° C.; Ketron® GF 30 PEEK is a glass-filled PEEK material having a temperature of deflection under load according to ISO 75-1/-2, method A at 1.8 MPa of 230° C.; and Ketron® CA30 PEEK is a carbon-filled PEEK material having a temperature of deflection under load according to ISO 75-1/-2, method A at 1.8 MPa of 260° C. These materials are available from Quadrant Plastics (the Quadrant Group of Mitsubishi Chemical Corporation). Successful plug operating temperature range has been demonstrated as extending from at least −40 to 200° C.

FIG. 4 shows an alternative embodiment of the plug body (40) in which the thickness Tew is significantly increased.

FIG. 5 shows another alternative embodiment of the plug body (40). In this embodiment, the second polymer of the plug body (40) is in the alternative form of a solid cylinder (60a), and the first polymer is in the form a cylindrical structure (70) which is adhered to the solid cylinder (60a).

Figure 6:
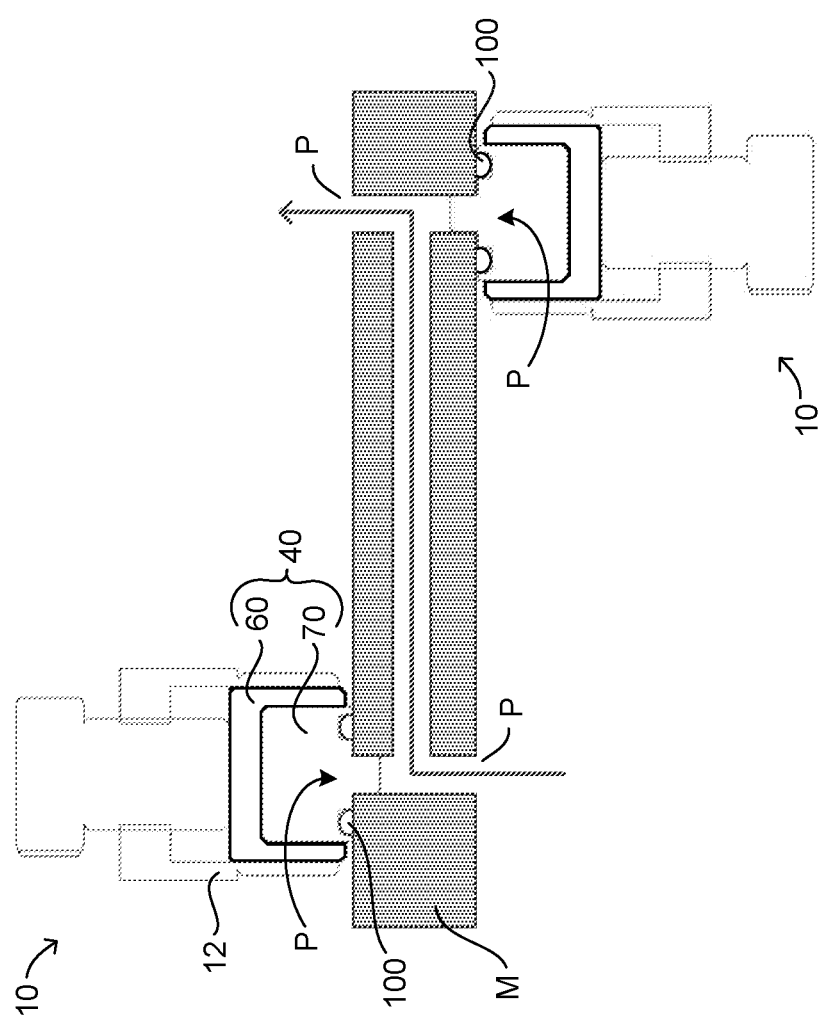
FIG. 6 is a diagrammatic cross section illustrating the use of a plug according to embodiments of the present disclosure with a flow reactor module.

FIG. 6 shows a diagrammatic cross section which illustrates the use of a plug (10) according to embodiments of the present disclosure with a flow reactor module M. Module M has multiple fluid ports P, two of which are closed by plugs (10), which are compressing O-rings 100 against the respective surfaces of the module M. A fluid path is thus created as represented by the arrow. For alternative fluid path arrangements, such as fluid bypass or parallelizing of modules, other configurations of plugs (10) or no plugs may be used. Plugs (10) may also be removed for cleaning the module or for replacement of plug parts.

The methods and/or devices disclosed herein are generally useful in performing any process that involves mixing, separation, extraction, crystallization, precipitation, or otherwise processing fluids or mixtures of fluids, including multiphase mixtures of fluids—and including fluids or mixtures of fluids including multiphase mixtures of fluids that also contain solids—within a microstructure. The processing may include a physical process, a chemical reaction defined as a process that results in the interconversion of organic, inorganic, or both organic and inorganic species, and desirably includes a chemical, physical, or biological process or reaction favored in the presence of light, of whatever wavelength, i.e., photoreactions, whether photosensitized, photoinitiated (as in photoinitiated radical reactions), photoactivated, photocatalytic, photosynthetic, or other). A non-limiting list of light-assisted or light-favored reactions of potential interest includes photoisomerizations, rearrangements, photoreductions, cyclizations, 2+2 cycloadditions, 4+2 cycloadditions, 4+4 cycloadditions, 1,3-dipolar cycloadditions, sigmatropic shifts (which could result in cyclisation), photooxidation, photocleavage of protecting groups or linkers, photohalogenations (phtochlorinations, photobrominations), photosulfochlorinations, photosulfoxidations, photopolymerizations, photonitrosations, photodecarboxylations, photosynthesis of previtamin D, decomposition of azo-compounds, Norrish type reactions, Barton type reactions. Further, the following non-limiting list of reactions may be performed with the disclosed methods and/or devices: oxidation; reduction; substitution; elimination; addition; ligand exchange; metal exchange; and ion exchange. More specifically, reactions of any of the following non-limiting list may be performed with the disclosed methods and/or devices: polymerisation; alkylation; dealkylation; nitration; peroxidation; sulfoxidation; epoxidation; ammoxidation; hydrogenation; dehydrogenation; organometallic reactions; precious metal chemistry/homogeneous catalyst reactions; carbonylation; thiocarbonylation; alkoxylation; halogenation; dehydrohalogenation; dehalogenation; hydroformylation; carboxylation; decarboxylation; amination; arylation; peptide coupling; aldol condensation; cyclocondensation; dehydrocyclization; esterification; amidation; heterocyclic synthesis; dehydration; alcoholysis; hydrolysis; ammonolysis; etherification; enzymatic synthesis; ketalization; saponification; isomerisation; quaternization; formylation; phase transfer reactions; silylations; nitrile synthesis; phosphorylation; ozonolysis; azide chemistry; metathesis; hydrosilylation; coupling reactions; and enzymatic reactions.

The foregoing description provides exemplary embodiments to facilitate an understanding of the nature and character of the claims. It will be apparent to those skilled in the art that various modifications to these embodiments can be made without departing from the spirit and scope of the appending claims.

What is claimed is:

1. A plug (10) for plugging a port in a flow reactor, the plug (10) comprising:
a metal guide (12) having first and second ends (14,16) and a wall (18) surrounding a cylindrical interior volume (20), the interior volume (20) having an opening (22) at the first end (14) of the guide (12) and being closed at the second end (16) of the guide (12) by a screw (24) mated to a screw thread (26) on the interior (28) of the second end (16) of the guide (20), the screw (24) having a screw end face (30) opposite the opening (22) of the interior volume (20); and
a plug body (40) having a first face (42) and an opposing second face (44) and a side surface (46) connecting the first face (42) and the second face (44), the plug body (40) positioned partially within the interior volume (20) of the guide (12) with the second face (44) of the plug body (40) and a first portion (48) of the side surface (46) of the plug body (40) positioned inside the interior volume (20) of the guide (12), and with the first face (42) of the plug body (40) and a second portion (50) of the side surface (46) of the plug body (40) protruding from the opening (22) of the interior volume (20) of the guide (12), the first face (42) comprising a recess (52) for receiving a gasket, the second face (44) facing the screw end face (30) for contact therewith, the plug body (40) comprising a first polymer having chemically resistant properties, said first face (42) of the plug body (40) being formed of said first polymer;
wherein the plug body (40) further comprises a second polymer having thermally resistant properties, with at least the first portion (48) of the side surface (46) of the plug body (40) and the second face (44) of the plug body (40) being formed of said second polymer.

2. The plug (10) according to claim 1 wherein the second polymer of the plug body (40) is in the form of a hollow cylinder (60) comprising a cylindrical wall (61) with a cylindrical wall thickness Tcw, the hollow cylinder (60) having a closed end (62) and an open end (63), the closed end (62) closed by an end wall (64) having an end wall thickness Tew, measured between an interior end surface (65) and an exterior end surface (66) of the end wall (64), the cylindrical wall (61) having an exterior surface (67) and an interior surface (68) connected by a rim surface (71), the exterior surface (67) of the cylindrical wall (61) constituting at least the first portion (48) of the side surface (46) of the plug body (40), the exterior end surface (66) constituting the second face (44) of the plug body (40), and wherein the first polymer is in the form a cylindrical structure (70) having a first end (72) constituting the first face (42) of the plug body (40) and a second end (74) extending into the hollow cylinder (60) to the interior end surface (65) thereof.

3. The plug (10) according to claim 2 wherein the hollow cylinder (60) is separable from the cylindrical structure (70).

4. The plug (10) according to claim 2 wherein the cylindrical wall thickness Tcw is in the range of at least 1.2 mm up to and including 4 mm.

5. The plug (10) according to claim 2 wherein the cylindrical wall thickness Tcw is in the range of at least 1.2 mm up to and including 2 mm.

6. The plug (10) according to claim 2 wherein the end wall thickness Tew is in the range of at least 1 mm up to and including 10 mm.

7. The plug (10) according to claim 2 wherein the end wall thickness Tew is in the range of at least 2 mm up to and including 4 mm.

8. The plug (10) according to claim 1 wherein the second portion (50) of the side surface (46) of the plug body (40) protrudes from the opening (22) of the interior volume (20) of the guide (12) by a distance d in the range of from at least 0.1 mm to less than 3 mm.

9. The plug (10) according to claim 1 wherein the second portion (50) of the side surface (46) of the plug body (40) protrudes from the opening (22) of the interior volume (20) of the guide (12) by a distance d in the range of at least 0.5 mm to less than 2 mm.

10. The plug (10) according to claim 1 wherein the recess of the first face (42) of the plug body (40) for receiving a gasket includes both a radially outer wall (54) and a radially inner wall (56).

11. The plug (10) according to claim 1 wherein the first face (42) of the plug body (40) further comprises a central post (58).

12. The plug (10) according to claim 1 wherein the second polymer has a temperature of deflection under load according to ISO 75-1/-2, method A at 1.8 MPa in the range of from 160° C. to 260° C.

13. The plug (10) according to claim 1 wherein the second polymer has a temperature of deflection under load according to ISO 75-1/-2, method A at 1.8 MPa in the range of from 230° C. to 260° C.

14. The plug (10) according to claim 1 wherein the second polymer is glass-filled PEEK.

15. The plug (10) according to claim 1 wherein the first polymer has a chemical resistance such that when a sample thereof in the form of a cylinder of diameter of 1+/−0.1 cm and length of 5+/−0.1 cm is subjected to immersion in 70% by volume $HNO_3$ for one week at 90+/−1° C., the sample is not significantly damaged on visual inspection and has a weight gain of not more than 1% of an initial weight of the sample.

16. The plug (10) according to claim 15, wherein the sample has a weight increase of not more than 0.1% of the initial weight of the sample.

17. The plug (10) according to claim 1 wherein the first polymer is one of PTFE, FEP, PFA, and ETFE.

18. The plug (10) according to claim 1 wherein the first polymer is PFA.

* * * * *

UNITED STATES PATENT AND TRADEMARK OFFICE
CERTIFICATE OF CORRECTION

PATENT NO. : 11,224,851 B2
APPLICATION NO. : 17/044630
DATED : January 18, 2022
INVENTOR(S) : Gremetz et al.

It is certified that error appears in the above-identified patent and that said Letters Patent is hereby corrected as shown below:

In the Claims

In Column 7, Line 36, in Claim 8, delete "din" and insert -- d in --.

Signed and Sealed this
Twenty-sixth Day of April, 2022

Katherine Kelly Vidal
*Director of the United States Patent and Trademark Office*